(12) United States Patent
Rocher et al.

(10) Patent No.: US 12,530,442 B2
(45) Date of Patent: Jan. 20, 2026

(54) DEVICE FOR AUTOMATICALLY DETECTING COUPLING BETWEEN ELECTRONIC DEVICES

(71) Applicant: Vitesco Technologies GmbH, Regensburg (DE)

(72) Inventors: Jacques Rocher, Toulouse (FR); Yannick Leroy, Toulouse (FR)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 394 days.

(21) Appl. No.: 18/013,415

(22) PCT Filed: Jun. 16, 2021

(86) PCT No.: PCT/EP2021/066289
§ 371 (c)(1),
(2) Date: Dec. 28, 2022

(87) PCT Pub. No.: WO2022/017692
PCT Pub. Date: Jan. 27, 2022

(65) Prior Publication Data
US 2023/0289426 A1    Sep. 14, 2023

(30) Foreign Application Priority Data

Jul. 21, 2020   (FR) ..................................... 2007634

(51) Int. Cl.
*G06F 21/34*   (2013.01)
*G01R 19/165*  (2006.01)
*G01R 19/145*  (2006.01)

(52) U.S. Cl.
CPC ....... *G06F 21/34* (2013.01); *G01R 19/16528* (2013.01); *G01R 19/145* (2013.01)

(58) Field of Classification Search
CPC .................. G06F 21/34; G06F 15/177; G01R 19/16528; G01R 19/145
USPC .......................................................... 726/17
See application file for complete search history.

(56) References Cited

U.S. PATENT DOCUMENTS

2011/0167919 A1*  7/2011  Plochinger .............. G01L 27/00
                                                          235/487
2012/0139615 A1   6/2012  Zimmermann
2014/0292776 A1* 10/2014  Tanaka .................... G06F 3/038
                                                          345/520
2019/0252872 A1   8/2019  Rocher et al.
(Continued)

FOREIGN PATENT DOCUMENTS

CN    109937366 A    6/2019
FR    3090888 A1     6/2020
(Continued)

OTHER PUBLICATIONS

International Search Report and Written Opinion for International Application No. PCT/EP2021/066289, dated Oct. 26, 2021, 8 pages.
(Continued)

*Primary Examiner* — Jacob Lipman
(74) *Attorney, Agent, or Firm* — Buchanan Ingersoll & Rooney PC

(57) ABSTRACT

A method for automatically detecting a sensor coupled to an electronic computer including steps of detecting the sensor and steps of configuring a hardware interface.

7 Claims, 3 Drawing Sheets

(56) References Cited

U.S. PATENT DOCUMENTS

2020/0323518 A1\* 10/2020 Hoffman .............. A61B 8/585
2022/0050146 A1    2/2022 Leroy et al.

FOREIGN PATENT DOCUMENTS

FR        3090925 A1    6/2020
WO   WO-2020127672 A1 \* 6/2020   .......... G01R 19/145

OTHER PUBLICATIONS

International Search Report and Written Opinion for International Application No. PCT/EP2021/066289, dated Oct. 26, 2022, 12 pages (French).
Office Action (The First Office Action) issued Apr. 23, 2025, by the State Intellectual Property Office of People's Republic of China in corresponding Chinese Patent Application No. 202180049449.5 and an English translation of the Office Action. (15 pages).

\* cited by examiner

DEVICE FOR AUTOMATICALLY DETECTING COUPLING BETWEEN ELECTRONIC DEVICES

CROSS REFERENCE TO RELATED APPLICATIONS

This application is the U.S. National Phase Application of PCT International Application No. PCT/EP2021/066289, filed Jun. 16, 2021, which claims priority to French Patent Application No. 2007634, filed Jul. 21, 2020, the contents of such applications being incorporated by reference herein.

FIELD OF THE INVENTION

The present invention relates generally to the coupling of electronic devices. The invention finds applications, in particular, in the automotive field. It may be implemented, for example, in an electronic computer.

BACKGROUND OF THE INVENTION

A motor vehicle nowadays comprises more and more onboard electronics such as, for example, sensors coupled to electronic computers. These onboard electronics require connection technology of greater or lesser complexity in the motor vehicle.

In the case of an internal combustion engine, sensors are used and coupled to at least one electronic computer such as an engine control computer in order to ensure the correct operation of said internal combustion engine and thus allow better control of fuel consumption and therefore control of the emission of pollutants into the atmosphere.

To produce these sensors, it is known practice in the prior art to use a voltage-source sensor positioned facing a movable notched target. Said sensor generally has three sensor pins for transferring a detection signal in the form of a variation in voltage to the engine control computer.

For a few years, a new sensor technology has been developed: current-source sensors. These sensors deliver information in the form of a variation in current.

Depending on the type of sensor used, the engine control computer has a different dedicated hardware interface allowing the coupling of said sensor to said engine control computer. This interface allows, with suitable electronics (in the electronic computer) electrical signals which are appropriate for managing, in this case, the internal combustion engine to be generated and received.

Thus, it is necessary, when designing the engine control computer, to modify its hardware interface depending on the type of sensor connected, that is to say a voltage-source sensor or a current-source sensor. Consequently, it is no longer possible, once the choice of sensor has been made, to change the type of sensor, for example over the lifespan of the vehicle, because the hardware interface is not adaptive.

SUMMARY OF THE INVENTION

An aspect of the invention proposes a device for automatically detecting coupling which allows the technical lack in the cited prior art to be partially or wholly remedied.

To this end, in a first aspect of the invention, an electronic computer comprising a first computer pin, a second computer pin, a third computer pin and a fourth computer pin is proposed. A hardware interface is suitable for detecting the type of sensor coupled to the first computer pin, second computer pin and third computer pin, and for storing said type of sensor.

For example, the hardware interface comprises a detection module which is suitable for detecting the type of sensor coupled to the pins of the electronic computer and a storage module which is suitable for storing the type of sensor detected.

It is also envisaged that the storage module is suitable for storing the type of sensor coupled to said pins of the electronic computer in response to a change in state of a signal which is representative of an end of booting up the computer.

In one variant, the storage module is a D flip-flop.

In a second aspect of the invention, a method for automatically detecting a sensor coupled to an electronic computer is also proposed, comprising:

a second step e2), consisting in detecting an electric power supply to the electronic computer and moving to a third step e3) when it is detected, the third step e3), consisting in detecting the type of sensor coupled to the pins of the electronic computer, a fourth step e4), consisting in scanning a signal which is representative of the end of booting up the electronic computer, a fifth step e5), consisting in storing the type of sensor coupled to the terminals of the electronic computer.

BRIEF DESCRIPTION OF THE DRAWINGS

One preferred exemplary embodiment of the invention will now be described with reference to the appended drawings, in which.

DETAILED DESCRIPTION OF THE PREFERRED EMBODIMENTS

Figure 1:
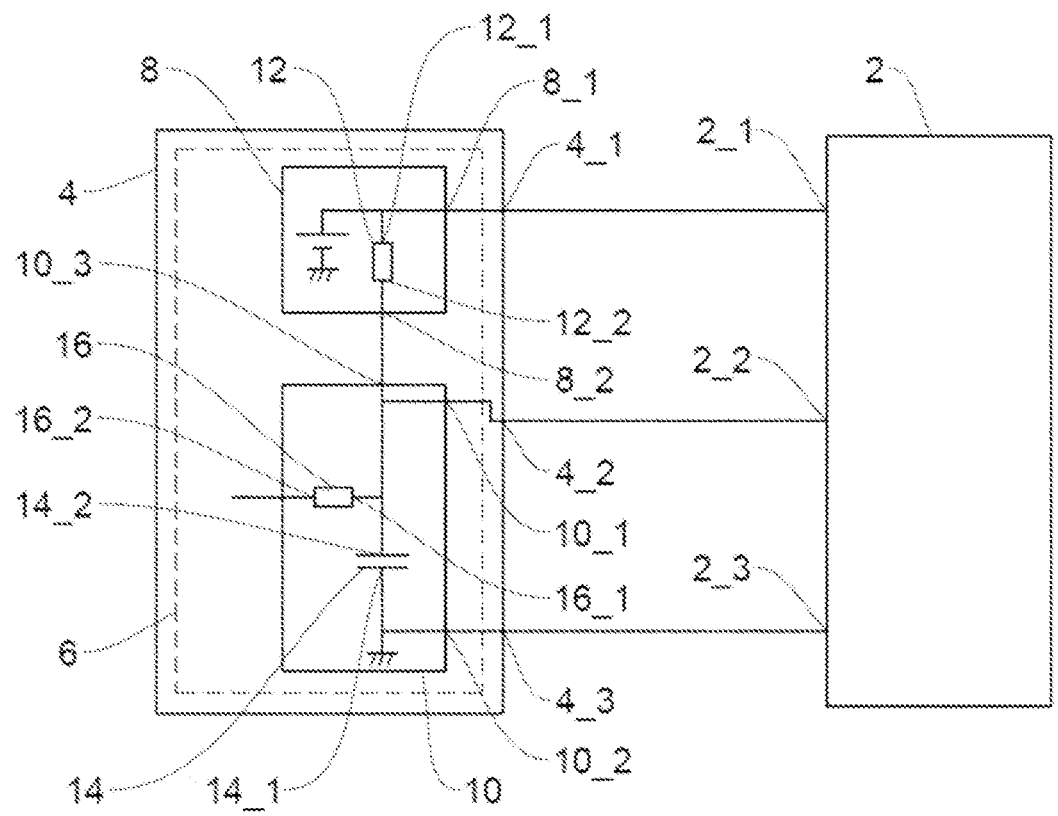
FIG. 1 shows a schematic view of a computer of the prior art coupled to a voltage-source sensor.

FIG. 1 illustrates a voltage-source sensor 2 of the prior art coupled, for example, to an engine control computer 4. The voltage-source sensor 2 is, for example, a sensor dedicated to detecting the positioning of a camshaft of an internal combustion engine through the movement of teeth of said target in front of said voltage-source sensor 2. It is specified here that, in the text of the description, the word "pin" or "terminal" of a component will be used interchangeably.

Such a voltage-source sensor 2 generally comprises three pins with a first sensor pin 2_1 coupled, for example, to a first computer pin 4_1 and suitable for supplying said voltage-source sensor 2 with electric power; a second sensor pin 2_2 coupled to a second computer pin 4_2 dedicated to receiving a signal which is representative of the position of the camshaft; and finally a third sensor pin 2_3 coupled to a third computer pin 4_3 which is generally coupled to an electrical ground of the motor vehicle. The internal structure of the voltage-source sensor 2 is well known to a person skilled in the art; it will therefore not be presented in detail here.

The engine control computer 4 has a hardware interface 6 comprising, for example, a sensor power-supply module 8 and a signal processing module 10.

The sensor power-supply module 8 is suitable for supplying electric power to the voltage-source sensor 2. To do this, it has a first sensor power-supply module pin 8_1 suitable for generating said electric power supply for said voltage-source sensor 2 through the first computer pin 4_1. For example, the electric power supply has a value of 5 V. The internal structure of the sensor power-supply module 8 is well known to a person skilled in the art and numerous variants are available to them.

In one exemplary embodiment, the sensor power-supply module 8 comprises an electric power supply, which may be a power supply that is internal to the engine control computer 4, and a so-called "pull-up" resistor 12. Said pull-up resistor 12 has the role of biasing the voltage-source sensor 2. The pull-up resistor 12 comprises a first resistor pin 12_1 coupled, on the one hand, to the electric power supply and, on the other hand, to the first sensor power-supply module pin 8_1. It further comprises a second resistor pin 12_2 coupled to a second electric power-supply module pin 8_2.

The signal processing module 10 is suitable for shaping and/or filtering a signal originating from the voltage-source sensor 2. For this purpose, the signal processing module 10 comprises a first signal processing module pin 10_1, a second signal processing module pin 10_2 and a third signal processing module pin 10_3.

For example, the first signal processing module pin 10_1 is coupled to the second computer pin 4_2 and also to the third signal processing module pin 10_3. The second signal processing module pin 10_2 is coupled to the third computer pin 4_3 and the third signal processing module pin 10_3 is coupled to the second electric power-supply module pin 8_2. A fourth signal processing module pin 10_4 is suitable for generating a filtered signal for at least one other function of the engine control computer 4.

Furthermore, the internal structure of the signal processing module 10 may comprise a first capacitor 14 having a first first capacitor pin 14_1 and a second first capacitor pin 14_2. The second first capacitor pin 14_2 is coupled to electrical ground and the first first capacitor pin 14_1 is coupled, on the one hand, to a first resistor pin 16_1 and, on the other hand, to the third signal processing module pin 10_3. Furthermore, the third pin 10_3 is coupled to the first pin 10_1. The signal processing module 10 further has a resistor 16 having a second resistor pin 16_2. The second resistor pin 16_2 is coupled to the fourth signal processing module pin 10_4. The values of the various elements, such as the resistors and the capacitor, are well known to a person skilled in the art and are consequently not given here.

Figure 2:
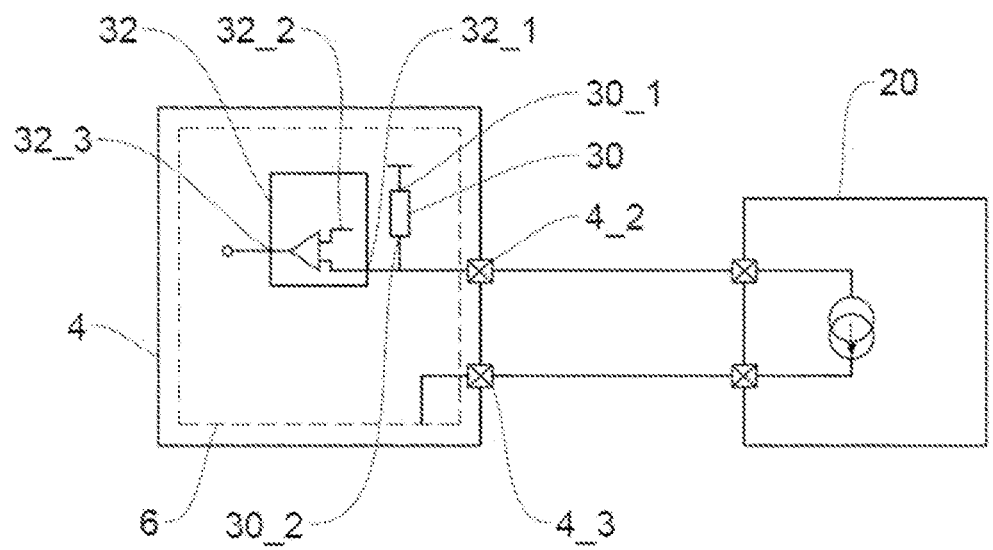
FIG. 2 shows a schematic view of a computer of the prior art coupled to a current-source sensor.

FIG. 2 presents an example of a current-source sensor 20 of the prior art. This current-source sensor 20 operates and is coupled to the engine control computer 4. The current-source sensor 20 delivers information in the form of a current variation requiring a different hardware interface 6 for the engine control computer 4 in order to be able to detect close current levels originating from the current-source sensor 20.

For this purpose, a resistor 30 known by a person skilled in the art as a shunt resistor may be used, comprising a first resistor pin 30_1 and a second resistor pin 30_2. The first resistor pin 30_1 is coupled to the electric power supply of said engine control computer 4, the second resistor pin 30_2 is coupled, on the one hand, to the second computer pin 4_2 and, on the other hand, to a first conversion device pin 32_1. The conversion device 32 is suitable for comparing and matching the voltage applied to the second resistor pin 30_2 and the reference voltage applied to the second conversion device pin 32_2.

The conversion device 32 further has a second conversion device pin 32_2 coupled to a reference voltage. The value of the reference voltage may, for example, be 4.5 V. Furthermore, the conversion device 32 has a third conversion device pin 32_3 coupled to internal functions of the engine control computer 4. The latter is therefore suitable for generating an electrical signal in the form of at least two voltage levels which are representative of the current flowing through the shunt resistor 30. Preferably, the shunt resistor 30 has a relatively low value of the order, for example, of 10 ohms.

As mentioned above in the text of the description, for each type of sensor 2, 20, it is therefore necessary, upstream, to modify the internal structure of the hardware interface 6.

Figure 3:
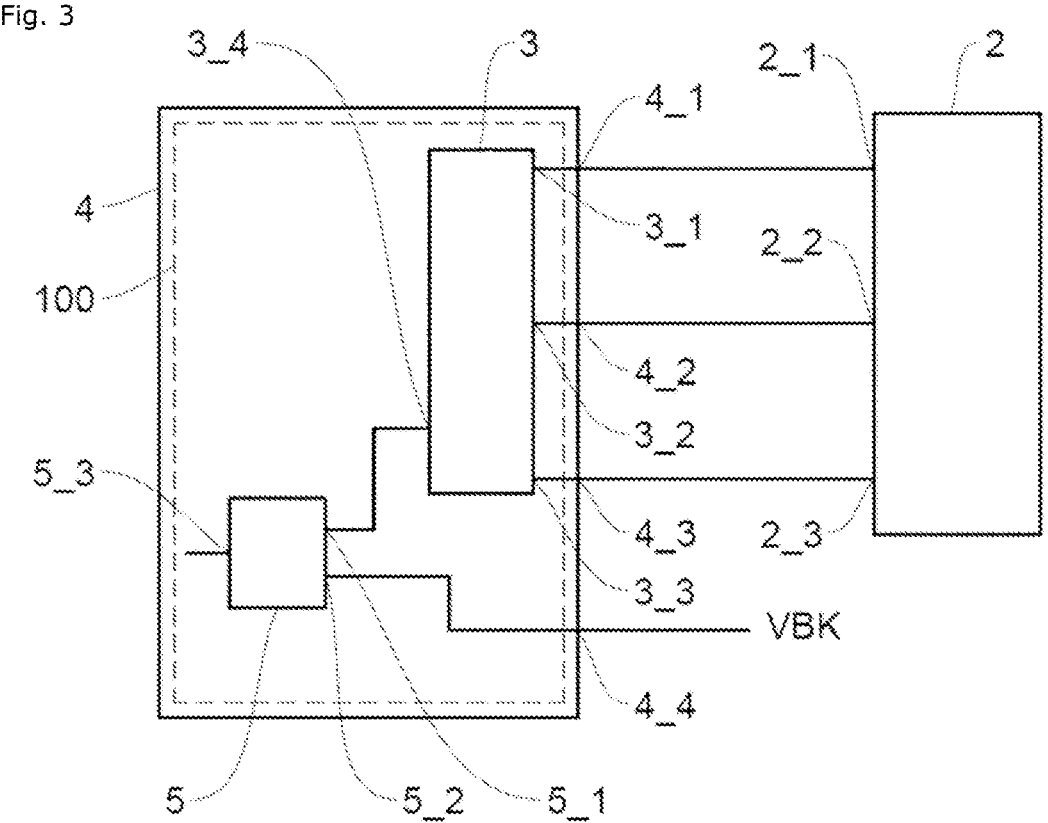
FIG. 3 shows a schematic view of a computer comprising a hardware interface according to an aspect of the invention.

An aspect of the invention proposes, as illustrated in FIG. 3, a hardware interface 100 allowing the type of sensor 2, 20 coupled to the terminals of the electronic computer 4 to be detected and stored without modifying the internal structure of the hardware interface 100 upstream.

Thus, advantageously, the hardware interface 100 is compatible with the two types of sensors 2, 20.

The hardware interface 100 comprises, in one preferred embodiment, a detection module 3 which is suitable for detecting the type of sensor 2, 20 coupled to the terminals of the electronic computer 4 and a storage module 5 which is suitable for storing the type of sensor 2, 20 coupled to said terminals of the electronic computer 4.

The detection module 3 comprises a first input 3_1, a second input 3_2 and a third input 3_3 coupled to the first computer pin 4_1, to the second computer pin 4_2 and to the third computer pin 4_3, respectively. The detection module 3 further comprises a first output 3_4 coupled to a first input 5_1 of the storage module 5. Thus, by virtue of the detection module 3, it is possible, as soon as the electronic computer 4 is powered up, to detect the type of sensor 2, 20 coupled.

Furthermore, by virtue of the detection module 3, it is possible to change the type of sensor 2, 20 without modifying the internal structure of the electronic computer 4 and/or of its internal interface 100.

In order to avoid detecting untimely failures when the electronic computer 4 is powered up, an aspect of the invention proposes a hardware interface comprising the storage module 5, which is suitable for storing, in accordance with a defined strategy, the type of sensor 2, 20 coupled to the terminals of the electronic computer 4. For this purpose, it is proposed that, in addition to the first input 5_1, the storage module 5 comprise a second input 5_2 coupled to a fourth computer pin 4_4. The fourth computer pin 4_4 is suitable for receiving a boot-up signal which may, for example, be a signal named VBK indicating the presence of a starter key for said vehicle.

The storage module 5 further comprises an output 5_3 which is suitable for generating a storage signal which is representative of the type of sensor 2, 20 coupled to the terminals of the electronic computer 4. Thus, by virtue of the hardware interface 100 according to an aspect of the invention, it is possible to automatically detect the type of sensor 2, 20 coupled to the terminals of the electronic computer 4 and to store the type thereof (of sensor) in order to avoid, for example, detecting possible failures when the electronic computer 4 starts up.

The internal structure of the storage module 5 may be produced with, for example, a D flip-flop. Of course, a person skilled in the art will understand that other types of components may also perform this storage function.

Figure 4:
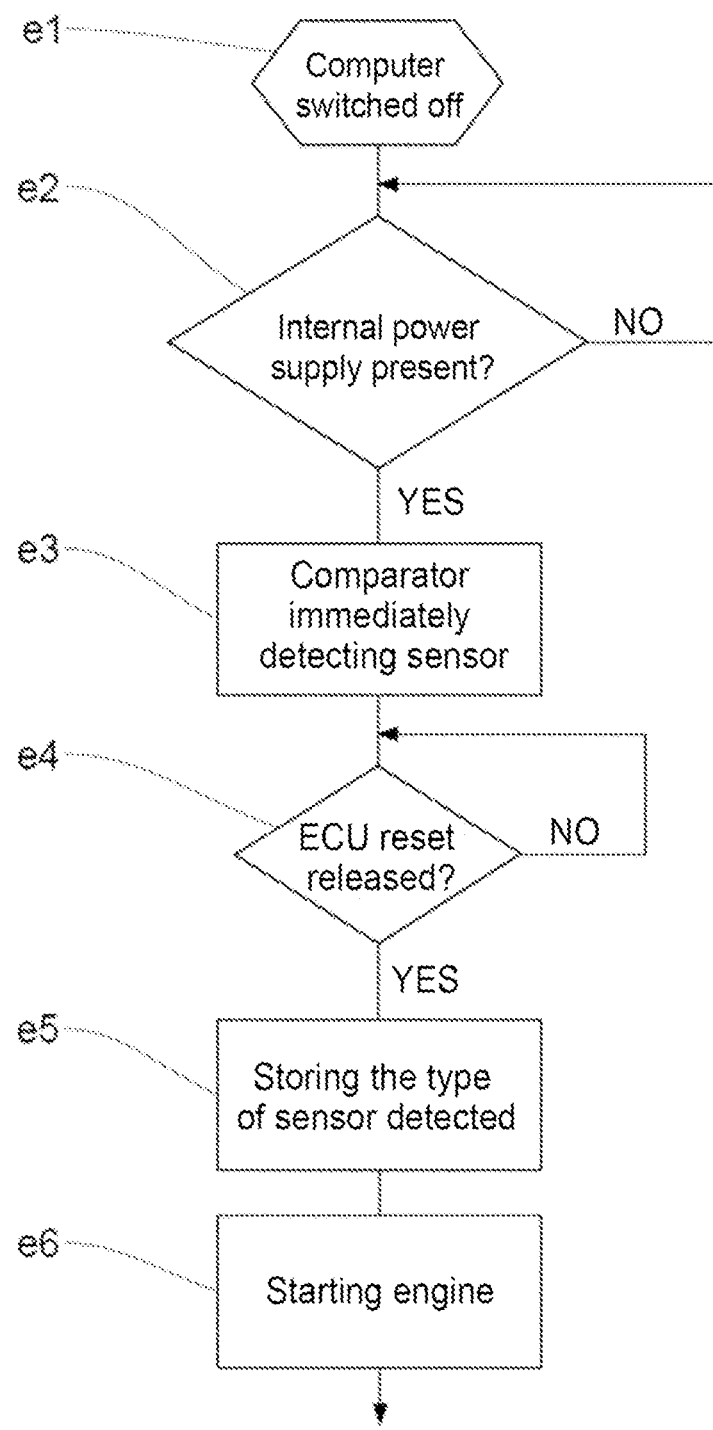
FIG. 4 shows an algorigram of the method according to an aspect of the present invention.

An aspect of the invention proposes, in a second aspect, a method for detecting and storing the type of sensor 2, 20 coupled to the pins of the electronic computer 4, as illustrated in FIG. 4.

First of all, during a first step e1), the method of an aspect of the invention is inactive, that is to say that the electronic computer 4 is switched off, powered down.

When, during the second step e2), an electric power supply to the electronic computer 4 is detected, then the method proposes moving to a third step e3).

During the third step e3), the method detects the type of sensor 2, 20 coupled to the pins of the electronic computer 4. This step is, for example, performed by the detection module 3 of the hardware interface 100. Once the type of sensor 2, 20 has been detected, the method proposes moving to a fourth step e4).

During the fourth step e4), the method scans a signal at the second input 5_2 of the storage module 5. The signal applied to the second input 5_2 is, for example, representative of the end of a boot-up state of the electronic computer 4 following its activation when the vehicle is started up. Thus, once the end of booting up the electronic computer 4 is detected, the method moves to a fifth step e5).

The fifth step e5) consists in the storage module 5 storing the type of sensor 2, 20 detected by the detection module 3. For example, this may be achieved by changing a state of the output 5_3 of the storage module 5. Once the storing has been done by the storage module 5, it is proposed, for example, to wait for the engine of the vehicle to start up during a sixth step e6).

Of course, it is entirely possible to envisage performing other steps once the type of sensor 2, 20 has been detected and stored.

The method according to an aspect of the invention is integrated into a strategy for starting up and booting up an electronic computer 4 which does not limit its number of steps only to those presented here.

By virtue of an aspect of the invention, it is now possible to detect and store the type of sensor coupled to the terminals of an engine control computer, that is to say a voltage-source or current-source sensor, automatically. Furthermore, it is possible to change the type of sensor over the lifespan of the engine control computer without changing the latter depending on the type of sensor. It is now, furthermore, possible to avoid certain anomalies when coupling the sensor.

The electronic circuits of the hardware interface are given by way of illustration and are in no way limiting with regard to the scope of the invention. In relation to the order of the steps of the method of the invention and their number, they are also given by way of illustration and a person skilled in the art may modify them as appropriate.

The invention claimed is:

1. An electronic computer comprising:
    a first computer pin:
    a second computer pin:
    a third computer pin; and
    a fourth computer pin; and
    a hardware interface, coupled to the electronic computer, the hardware interface adapted to:
        detect and identify a type of sensor coupled to the first computer pin, the second computer pin, and the third computer pin, and
        then, in response to a change in state of a signal received by the hardware interface and the computer, store said detected type of sensor in the hardware interface, wherein the signal received by the hardware interface and the computer comprises a boot-up signal.

2. The electronic computer as claimed in claim 1, wherein the boot-up signal is representative of an end of a booting up the computer.

3. A method for automatically detecting of a sensor coupled to an electronic computer as claimed in claim 1, the method comprising:
    a first step e1), of detecting that the electronic computer is inactive;
    a second step e2), of detecting-a supply electric power to the electronic computer and moving to a third step e3) when the supply of electric power to the electronic computer is detected;
    the third step e3), of detecting a type of sensor coupled to the pins of the electronic computer;
    a fourth step e4), of scanning a signal received by the electronic computer, wherein the signal is representative of an end of a booting up the electronic computer; and
    a fifth step e5), of storing, in response to scanning the signal received by the electronic computer, the type of sensor detected as coupled to the terminals of the electronic computer in step e3).

4. The method of claim 3, wherein the scanning of step e4) is at an input of a storage module of the electronic computer.

5. The electronic computer as claimed in claim 1, wherein the hardware interface comprises:
    a detection module for detecting the type of sensor coupled to the pins of the electronic computer; and
    a storage module for storing the type of sensor detected by the detection module.

6. The electronic computer as claimed in claim 5, in which the storage module is a D flip-flop.

7. The electronic computer as claimed in claim 5, wherein the computer boot-up signal is representative of an end of a booting up the computer.

* * * * *